United States Patent
Stone et al.

(10) Patent No.: US 11,378,045 B2
(45) Date of Patent: Jul. 5, 2022

(54) ENGINE AIR CLEANER WITH INTEGRATED COMPRESSOR SUPPRESSOR

(71) Applicant: DONALDSON COMPANY, INC., Minneapolis, MN (US)

(72) Inventors: Stephen A. Stone, Minneapolis, MN (US); Richard P. Manahan, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 16/964,678

(22) PCT Filed: Feb. 6, 2019

(86) PCT No.: PCT/US2019/016803
§ 371 (c)(1),
(2) Date: Jul. 24, 2020

(87) PCT Pub. No.: WO2019/157026
PCT Pub. Date: Aug. 15, 2019

(65) Prior Publication Data
US 2021/0054811 A1    Feb. 25, 2021

Related U.S. Application Data

(60) Provisional application No. 62/626,875, filed on Feb. 6, 2018.

(51) Int. Cl.
*F02M 35/14*    (2006.01)
*B01D 46/42*    (2006.01)
(Continued)

(52) U.S. Cl.
CPC ......... *F02M 35/14* (2013.01); *B01D 46/4236* (2013.01); *F02M 35/024* (2013.01);
(Continued)

(58) Field of Classification Search
CPC ................. F02M 35/14; F02M 35/024; F02M 35/10321; F02M 35/10347;
(Continued)

(56) References Cited

U.S. PATENT DOCUMENTS 4,236,901 A * 12/1980 Kato ................... B01D 46/0005
                                                            137/515.7
4,790,864 A * 12/1988 Kostun ................ F02M 35/021
                                                            123/198 E
(Continued)

FOREIGN PATENT DOCUMENTS

DE    19737701 A1 *  3/1999  ............. F02M 35/14
DE    19737701 A1    3/1999
(Continued)

OTHER PUBLICATIONS

International Patent Application No. PCT/US2019/016803, International Search Report and Written Opinion dated May 13, 2019, 14 pages.

*Primary Examiner* — Jacob M Amick
*Assistant Examiner* — Charles J Brauch
(74) *Attorney, Agent, or Firm* — Fredrikson & Byron, P.A.

(57) ABSTRACT

An air cleaner assembly can contain an air filter element to filter contaminant material out of an air stream. In some examples, the air cleaner assembly includes a housing with an integrated noise suppression chamber for supplying air to a downstream compressor. The housing forms a cavity into which an air filter element is inserted. Contaminated air enters the housing and passes through the air filter. Filtered air can discharge from the housing through a first opening supplying air to a combustion engine and a second opening supplying air to a compressor. Air supplied to the compressor passes from the interior of the housing containing the filter element and through the integrated noise suppression (Continued)

chamber before being discharged. The acoustic energy released by the filtered air stream exiting the air cleaner assembly may be reduced by passing through the noise suppression chamber.

19 Claims, 5 Drawing Sheets

(51) Int. Cl.
    *F02M 35/024*     (2006.01)
    *F02M 35/10*     (2006.01)
    *F02M 35/12*     (2006.01)

(52) U.S. Cl.
    CPC   *F02M 35/10321* (2013.01); *F02M 35/10347* (2013.01); *F02M 35/1222* (2013.01); *B01D 2279/60* (2013.01)

(58) Field of Classification Search
    CPC ......... F02M 35/1222; F02M 35/02483; F02M 35/164; F02M 35/0201; F02M 35/0202; F02M 35/042; B01D 46/4236; B01D 2279/60
    See application file for complete search history.

(56) References Cited

U.S. PATENT DOCUMENTS

| | | | |
|---|---|---|---|
| 5,424,494 A * | 6/1995 | Houle | F02M 35/1261 |
| | | | 181/229 |
| 6,051,042 A | 4/2000 | Coulonvaux | |
| 2005/0279319 A1 | 12/2005 | Jessberger et al. | |

FOREIGN PATENT DOCUMENTS

| | | |
|---|---|---|
| EP | 1268038 A1 | 1/2003 |
| EP | 2169209 A1 | 3/2010 |
| JP | H06-4363 U | 1/1994 |
| WO | 0074818 A1 | 12/2000 |

* cited by examiner

ENGINE AIR CLEANER WITH INTEGRATED COMPRESSOR SUPPRESSOR

RELATED MATTERS

This application is a 35 U.S.C. 371 national stage filing from International Application No. PCT/US2019/016803, filed Feb. 6, 2019, which claims priority to US Provisional Application No. 62/626,875, filed Feb. 6, 2018. The entire contents of both these applications are incorporated herein by reference.

TECHNICAL FIELD

This disclosure relates to air cleaners and, more particularly, to air cleaners for filtering particulate material from engine air intake streams.

BACKGROUND

Air streams can carry contaminant material such as dust and liquid particulate. In many instances, it is desired to filter some or all of the contaminant material from the air stream. For example, air flow streams to engines (for example combustion air streams) for motorized vehicles or for power generation equipment, gas streams to gas turbine systems and air streams to various combustion furnaces, carry particulate contaminant that is desirably filtered out. In use, contaminated air is passed through a filtration medium, causing some or all of the contaminants present in the air to be entrained in the filtration medium. This yields a clean air stream that can be used in downstream processes.

SUMMARY

In general, this disclosure is directed to an air cleaner assembly that includes an air cleaner housing into which an air filter element can be inserted. The housing can include one or more inlet openings through which a stream of contaminated air enters the housing and a plurality of outlet openings through which filtered exits the housing. In some configurations, the housing includes two outlet opening: a main outlet opening through which a majority of the filtered air exits the housing and a secondary outlet opening through which a comparatively smaller amount of filtered air exits the housing. The main outlet opening can be connected to a downstream system that utilizes the filtered air, such as a combustion engine. The secondary outlet opening can also be connected to a downstream system that utilizes the filtered air, such as a compressor.

For example, a vehicle equipped with a combustion engine, such as an on-road semi-trailer truck or an off-road heavy equipment vehicle, may include a compressor that supplies compressed air to operational systems of the vehicle. The compressed air may be supplied to an air brake system (e.g., between the vehicle and a towed trailer), pneumatic equipment on the vehicle, or yet other system using compressed air. In either case, the air supplied to a pneumatic compressor on the vehicle can be filtered prior to being received and compressed (pressurized) by the compressor. Instead of utilizing a separate air filtration element to filter the air supplied by the compressor, the filtration element used to filter the main air supply delivered to the combustion engine on the vehicle can also be used to filter the air supplied to the compressor.

In accordance with some examples of the present disclosure, an air cleaner assembly includes a housing configured to receive and hold an air filtration element and an integrated noise suppression chamber. The housing can have a main outlet opening through which the majority of the filtered air exits the housing without passing through the noise suppression chamber. The housing can also have a secondary outlet opening through which filtered air exits the space holding the filtration element and enters the noise suppression chamber. The air stream passing through the noise suppression chamber may be acoustically dampened in the noise suppression chamber for supply to a downstream pneumatic system, such as an air compressor. As a result, the filtered air supplied to the downstream pneumatic system may be at a lower decibel level than if the filtered air was supplied directly to the downstream pneumatic system without having first passed through the noise suppression chamber. This can reduce undesirable noise generated by the secondary air stream moving through the air cleaner to the downstream pneumatic system.

In some examples, the air cleaner assembly includes a noise suppression chamber that is permanently formed or integrated with the housing holding the air filtration element. For example, an outer surface of a wall defining a chamber of the housing holding the air filtration element may form an inner surface of the noise suppression chamber. The noise suppression chamber and housing may be permanently formed or integrated together in that the features may not be removed or separated from each other without irreversibly modifying or destroying the features. By integrating the noise suppression chamber with the air filtration housing, a single, unitary assembly may be provided. This can facilitate efficient assembly, e.g., allowing an operator to simultaneously install the air filtration housing and noise suppression features on a vehicle during fabrication rather than necessitating separate installation steps. Further, the integration of the noise suppression chamber with the air filtration housing can eliminate the need to have comparatively high decibel air flow from the air filtration housing to a remotely located noise suppressor, further reducing the noise produced by the assembly.

In one example, an air cleaner assembly is described that includes a housing having at least one sidewall and a noise suppression chamber. The housing defines an interior cavity configured to receive an air filter element, an inlet opening configured to receive air to be filtered, a first outlet opening configured to discharge filtered air, and a second outlet opening configured to discharge filtered air. The noise suppression chamber is formed by the at least one sidewall of the housing and an exterior sidewall spaced from the at least one sidewall of the housing. The example specifies that the second outlet opening extends through the at least one sidewall of the housing in the region of the noise suppression chamber such that air is delivered through the second outlet into the noise suppression chamber. The example also specifies that the noise suppression chamber has an airflow outlet configured to discharge air from the noise suppression chamber.

The details of one or more examples are set forth in the accompanying drawings and the description below. Other features, objects, and advantages will be apparent from the description and drawings, and from the claims.

DETAILED DESCRIPTION

In general, this disclosure relates to air cleaner systems. In some examples, an air cleaner assembly includes two chambers separated from each other by a shared wall. One chamber of the air cleaner assembly defines a cavity that receives and holds an air filter element. The second chamber forms a space through which filtered air passes before being discharged from the air cleaner assembly. The second chamber can acoustically dampen the filtered air stream, reducing the amount of noise generated by the air stream exiting the air cleaner assembly as compared to if the air stream discharged from the assembly without passing through the second chamber.

While an air cleaner assembly according to the disclosure can be used in any desired application, in some configurations, the assembly is deployed on a vehicle equipped with a combustion engine and an air compressor. The air cleaner assembly can have multiple outlet openings that supply filtered air to different components of the vehicle utilizing filtered air. For example, the air cleaner assembly may include a first outlet opening supplying filtered to the combustion engine of the vehicle. The air cleaner assembly may also include a second outlet opening supplying filtered air to the compressor carried by the vehicle. Filtered air from the first chamber of the air cleaner assembly may flow through the second outlet opening, thereby crossing the shared sidewall separating the first chamber from the second chamber. Thereafter, the filtered air can flow through the second chamber of the air cleaner assembly before being discharged through an airflow outlet for supply to the compressor. An air cleaner assembly can have a variety of different features and designs as described herein.

Figure 1:
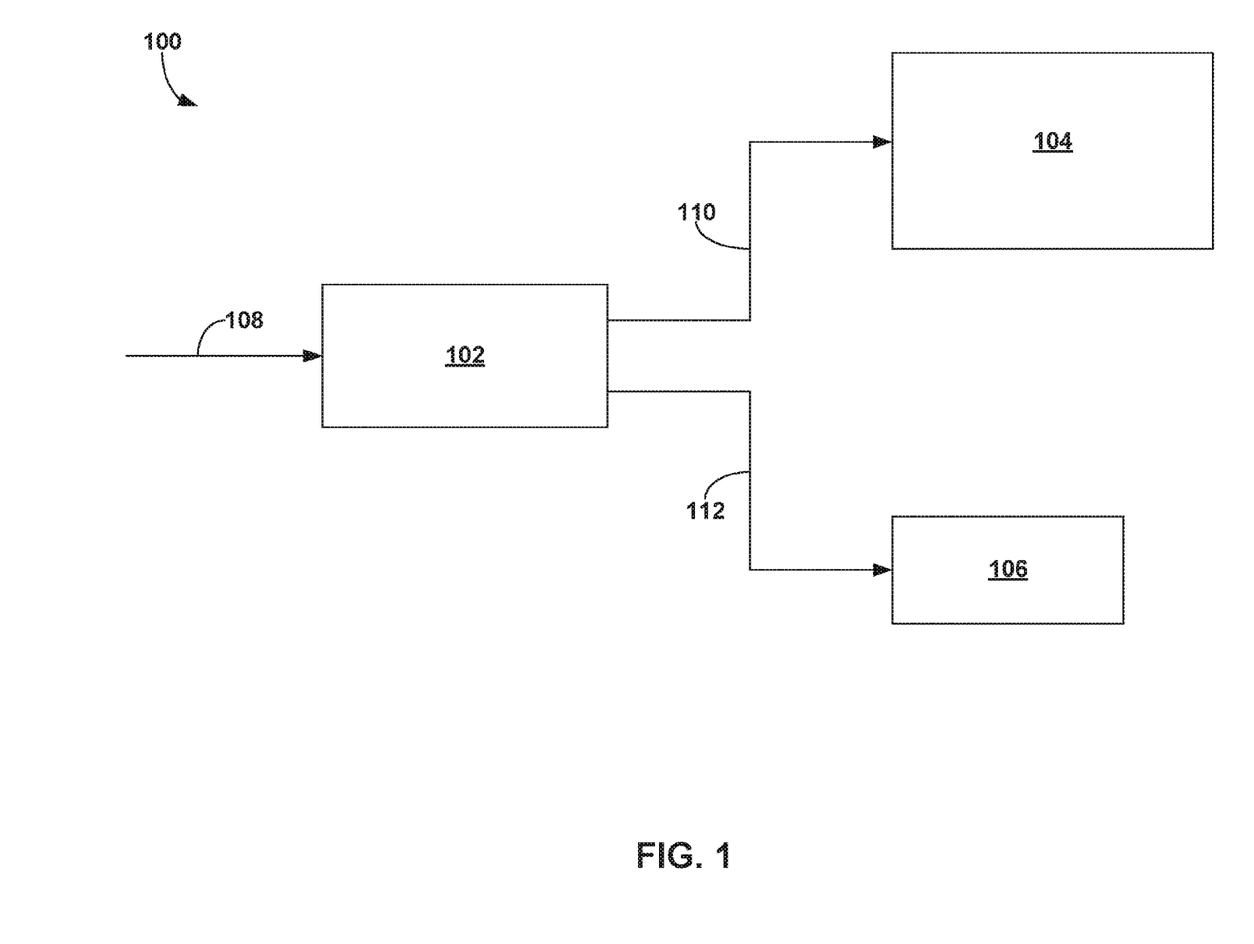
FIG. 1 is flow diagram showing an example air filtration system that can utilize an air cleaner assembly according to the disclosure.

FIG. 1 is flow diagram showing an example air filtration system 100 that can utilize an air cleaner assembly according to the disclosure. In the example of FIG. 1, air filtration system 100 includes air cleaner assembly 102, a first downstream system 104 receiving filtered air, and a second downstream system 106 receiving filtered air. During operation, air cleaner assembly 102 can receive a stream 108 of air to be filtered. The stream 108 of air received by air cleaner assembly 102 can pass through one or more air filtration elements contained within air cleaner assembly 102, removing contaminants from the air and producing a filtered air stream. The filtered air stream may be divided within air cleaner assembly 102 into a first filtered air stream 110 that is supplied to the first downstream system 104 and a second filtered air stream 112 that is supplied to the second downstream system 106. In some configurations, the air cleaner assembly 102 disproportionally divides the filtered air stream so first filtered air stream 110 have a greater volume than second filtered air stream 112.

First and second downstream systems 104, 106 may be any suitable elements that utilize air as an input source for operation. As one example, first downstream system 104 may be a combustion engine that receives first filtered air stream 110 to combust an oxidizable fuel source to generate motive power. Second downstream system 106 may be a pneumatic compressor that receives second filtered air stream 112 and compresses the air stream to produce compressed air. Through compression, the pressure of the second air stream may be increased.

Depending on the implementation of system 100, first downstream system 104 and second downstream system 106 may be mounted on a shared frame or chassis. For example, a vehicle equipped with a combustion engine, such as an on-road semi-trailer truck or an off-road heavy equipment vehicle, may include a compressor that supplies compressed air to operational systems of the vehicle or to a trailer or other equipment towed by the vehicle. The combustion engine and compressor may be mounted to the chassis of the vehicle, either directly or indirectly, providing a shared platform carrying the components. Air cleaner assembly 102 may also be carried by the same chassis, providing an integrated and mobile system for supplying filtered air to onboard systems.

Figure 2:
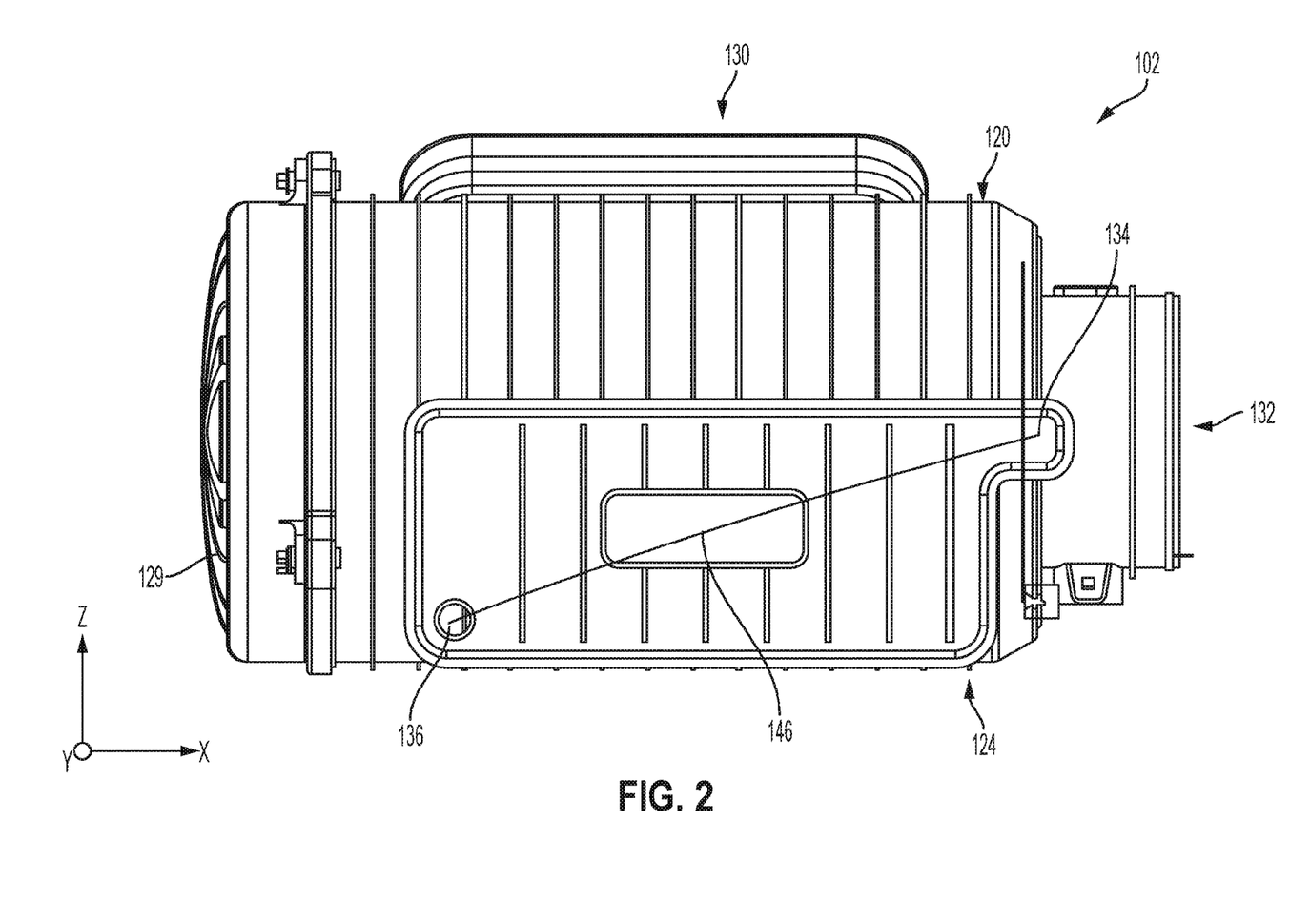
FIGS. 2-4 are different views of an example configuration of an air cleaner assembly.
Figure 3:
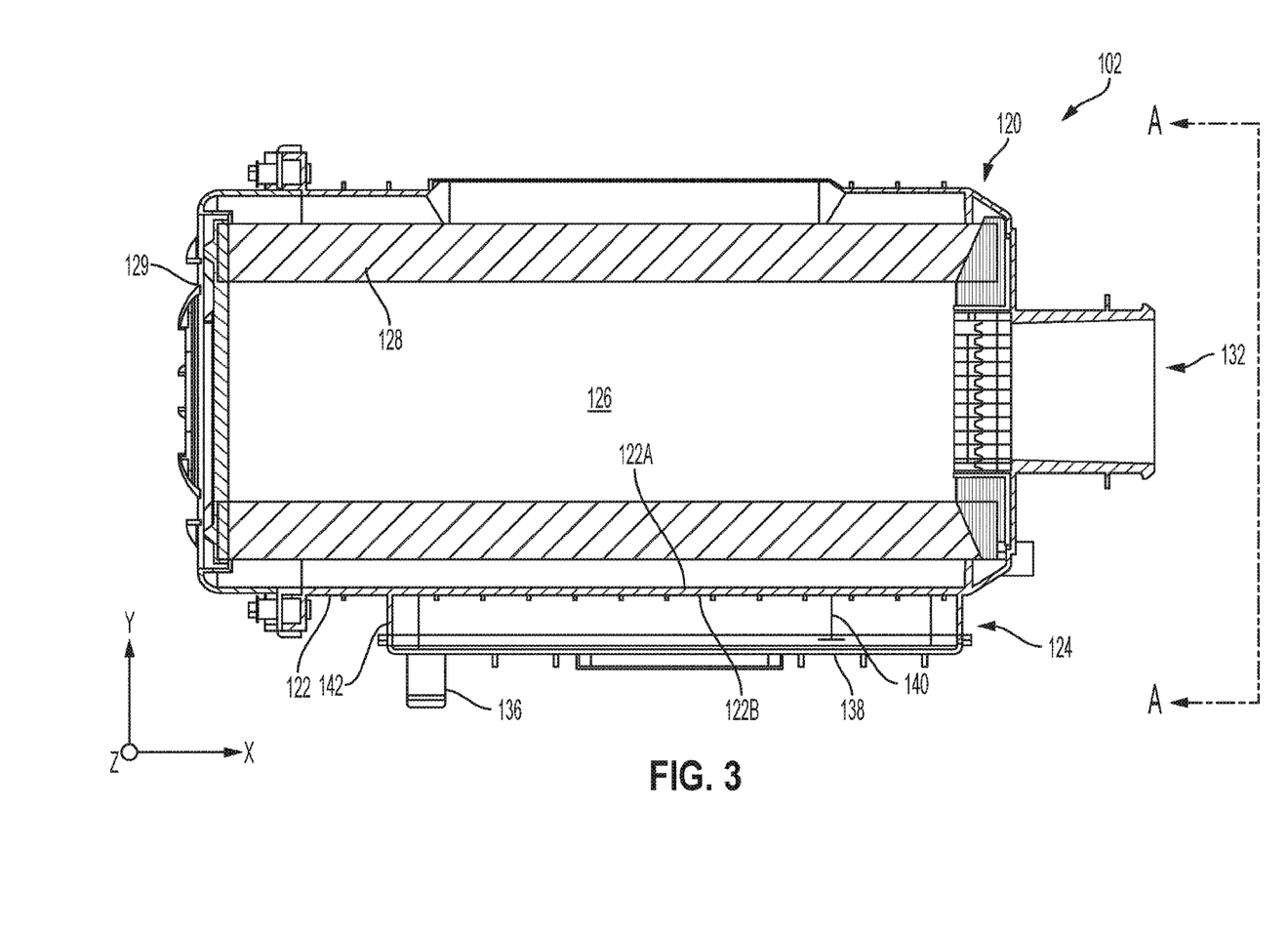
Figure 4:
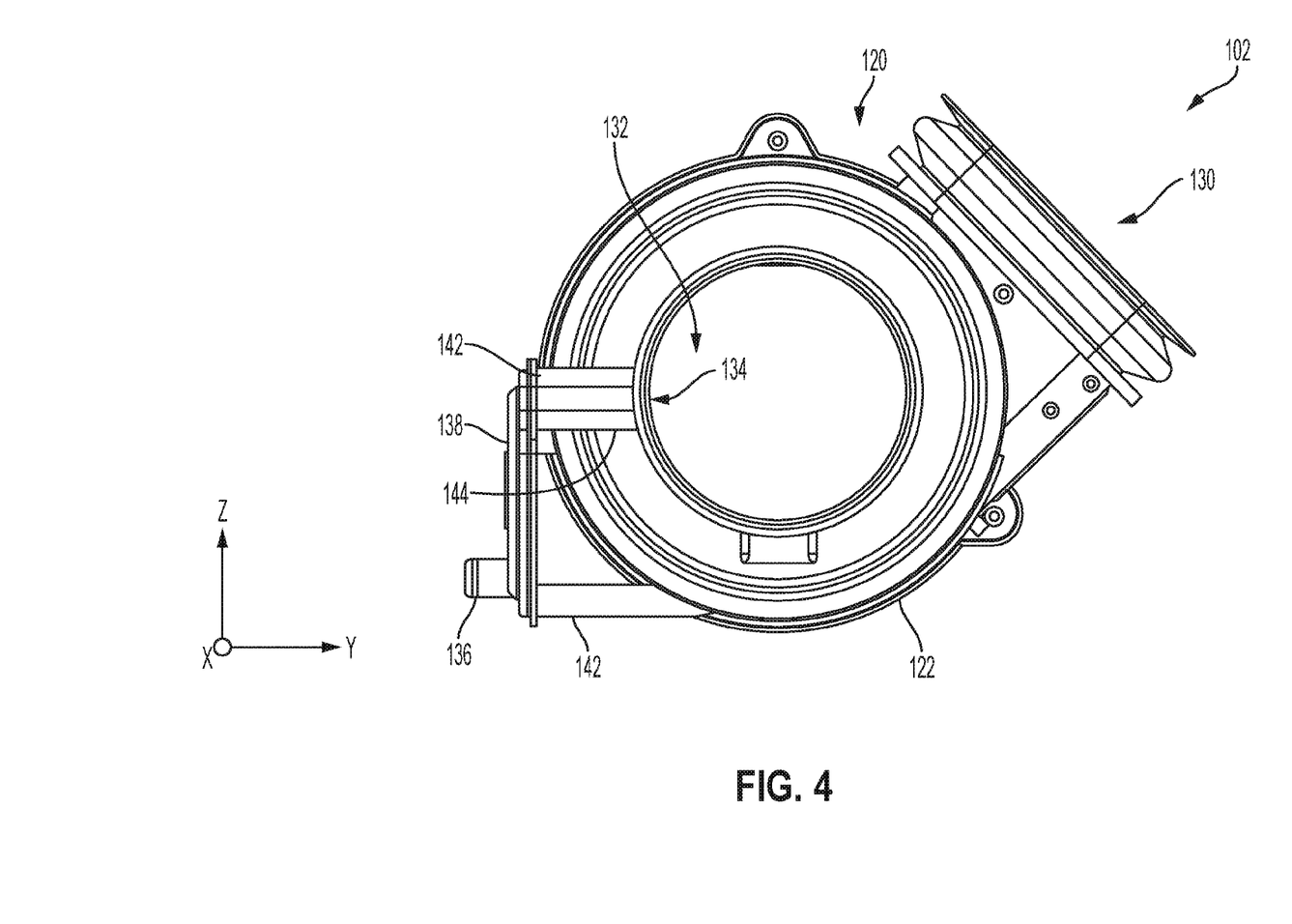

FIGS. 2-4 are different views of an example configuration of air cleaner assembly 102 that can be used in air filtration system 100. FIG. 2 is side perspective view of air cleaner assembly 102. FIG. 3 is a top sectional view of air cleaner assembly 102. FIG. 4 is an end view of air cleaner assembly 102 taken along the A-A line indicated on FIG. 3.

In the example of FIGS. 2-4, air cleaner assembly 102 is illustrated as including a housing 120 formed by one or more sidewalls 122 (FIG. 3) joined together. Air cleaner assembly 102 also includes a noise suppression chamber 124 integrated with and extending from housing 120. In operation, an air cleaner element can be inserted into housing 120 and air to be filtered passed through the housing. After having passed through the filtration element in the housing, filtered air can discharge from the housing for downstream use. Before exiting air cleaner assembly 102, a portion of the filtered air can pass from housing 120, through sidewall 122, into noise suppression chamber 124. The air may then flow through the noise suppression chamber before being discharged through a separate outlet port for downstream use. Noise suppression chamber 124 can acoustically dampen the air flowing through the chamber, reducing the amount of noise generated by the discharging air stream.

Housing 120 is formed by at least one sidewall 122 and defines an internal cavity 126 (FIG. 3) configured to receive one or more air filtration elements 128 in the internal cavity. Housing 120 may be bounded by a second sidewall 129, which is illustrated as an end wall, joined to the one or more sidewalls 122. In some configurations, end wall 129 is openable (e.g., removable) to service an interior of housing 120, replace air filtration element 128, or otherwise access internal cavity 126 of the housing.

In general, housing 120 includes an inlet opening 130 configured to receive air to be filtered. In some examples, a precleaner that includes a plurality of separator tube arrangements may be positioned upstream of inlet opening 130. When implemented, the precleaner can preclean selected material (contaminant) carried by an air stream introduced into air cleaner assembly 102, before the air reaches the filter cartridge positioned therein. Such precleaning generally leads to substantial removal of liquid particulate such as rain water or splashed water, etc. and/or various (especially larger) dust or other particles.

Housing 120 also includes a plurality of outlet openings through which filtered air exits the housing. In the example of FIGS. 2-4, housing includes a first outlet opening 132 and a second outlet opening 134 each configured to discharge filtered air having passed through air filtration element 128. Second outlet opening 134 is formed through sidewall 122 separating housing 120 from noise suppression chamber 124, allowing filtered air to pass from an interior of the housing to an interior of the noise suppression chamber.

The particular air cleaner housing 120 depicted generally has a cross-sectional shape with a long axis in the X-direction indicated on the figures (in a plane parallel to an axis or general direction of air flow when in use) and shorter axes perpendicular to the longer X-direction axis. The air cleaner assembly 102 can be configured so that it can be mounted in virtually any orientation in use, for example, with the longer cross-sectional axis generally vertical, horizontal, or any angle in between.

In addition, in the example shown, the internal cavity 126 of the housing 120 has a generally round cross-sectional shape formed by a single sidewall 122. The number of sidewalls interconnected together to form the housing 120 may vary depending on the shape of the housing. Further, housing 120 may have any desired shape. For example, rectangular, obround, and other essentially geometric shapes with rounded or non-rounded corners may be utilized. Some examples of obround include an oval shape with opposite curved ends attached by a pair of opposite sides. In some oval shapes, the opposite sides are also curved. In other oval shapes, sometimes called racetrack shapes, the opposite sides are generally straight. A housing 120 with a generally circular cross-sectional shape (e.g., in the Y-Z plane) may be formed of a single sidewall or multiple sidewall segments joined together. A housing 120 with a square or rectangular cross-sectional shape may be defined by four interconnected sidewalls.

First outlet opening 132 is illustrated as being defined by a portion of housing 120 extending axially away from a body containing air filtration element 128. For example, sidewall 122 in the example of FIGS. 2-4 transitions from a region of larger cross-sectional area defining the interior cavity 126 containing air filtration element 128 to a region of smaller cross-sectional area defining first outlet opening 132. In different configurations, the outlet arrangement forming first outlet opening 132 can be formed integral with a remainder of the body or can be formed separately from and attached to a remainder of the body to form the housing. The particular configuration of first outlet opening 132 depicted extends straight or axially from a reminder of the body. As a result, air flowing through housing 120 can enter inlet opening 130 radially and flows axially along the length of the housing through air filtration element 128 before discharging axially through first outlet opening 132. In other configurations, first outlet opening 132 may be angled relative to the axial length of housing 120 at a non-zero degree angle, such as at 45 degrees or 90 degrees.

Second outlet opening 134 delivers filtered air from an interior of housing 120 to noise suppression chamber 124. Noise suppression chamber 124 may extend from housing 120 and form a space through which filtered air travels before discharging for downstream use. Accordingly, second outlet opening 134 may extend through sidewall 122, forming an outlet from an interior of housing 120 and an inlet to an interior of noise suppression chamber 124. Noise suppression chamber 124 can include a separate airflow outlet 136 through which air having passed through the noise suppression chamber is discharged.

Noise suppression chamber 124 may define a cavity or space between a wall surface of housing 120 and an exterior wall spaced away from the housing. For example, with reference to FIG. 3, noise suppression chamber 124 may be a cavity formed between and bounded by sidewall 122 defining cavity 126 of housing 120 and an exterior sidewall 138 spaced from the sidewall 122 defining the housing. When so configured, the sidewall 122 forming housing 120 can define a first side 122A forming an inner surface of cavity 126 and an opposite side 122B (separated by the thickness of the wall material) forming an inner surface of noise suppression chamber 124. exterior sidewall 138 can be offset from the exterior-facing side 122B of housing 120 a distance 140 to define the noise suppression chamber.

To offset exterior sidewall 138 from the sidewall 122 defining housing 120 (or at least a portion thereof), a plurality of edge walls 142 (FIGS. 2 and 3) may project outwardly from sidewall 122. The edge walls 142 can connect the sidewall 122 defining housing 120 to the exterior sidewall 138, holding the exterior wall a spaced distance 140 from the sidewall. In instances where noise suppression chamber 124 has a rectangular shape, the edge wall 142 may comprise a top edge wall, a bottom edge wall, and opposite side walls (e.g., when oriented as illustrated). A different number or configuration of edge walls 142 is possible depending on the shape and orientation of noise suppression chamber 124.

In addition, the size and shape of noise suppression chamber 124 may vary based on a variety of factors such as, e.g., air flow throughput for the respective downstream systems 104, 106 for which the air cleaner assembly is to be used, space constraints and/or architectural limitations on the vehicle on which air cleaner assembly is to be installed. In the illustrated example of FIG. 2-4, housing 120 has a generally cylindrical cross-sectional shape (in the Y-Z plane) and sidewall 122 is curved. Further, exterior sidewall 138 is illustrated as being generally planar. As a result, the distance 140 between sidewall 122 and exterior sidewall 138 defining noise suppression chamber 124 varies across the height of the noise suppression chamber (e.g., in the Z-direction). For example, as seen in FIG. 4, the top edge wall 142 is shorter than the bottom edge wall 142 such that the noise suppression chamber 124 enlarges moving from second outlet opening 134 downwardly to airflow outlet 136. In other configurations, sidewall 122 and exterior sidewall 138 may be parallel to each other (e.g., either planar or curved) in the Z-direction. In addition, in the illustrated arrangement, exterior sidewall 138 is shown as extending parallel to sidewall 122 lengthwise along housing 120 (in the X-direction indicated on the figures). In other configurations, exterior sidewall 138 and sidewall 122 may have other spacings and/or orientations relative to each other than illustrated.

The specific dimensions of air cleaner assembly 102, including noise suppression chamber 124, may vary. In general, noise suppression chamber 124 defines a smaller volume than the volume of space defined by cavity 126 into which air filtration element 128 is inserted. In some examples, noise suppression chamber 124 defines a volume ranging from 1% to 15% of the volume defined by cavity 126. The length of noise suppression chamber 124 (in the X-direction indicated on FIGS. 2-4) may range from 25% to 90% of the length of housing 120, although other dimensions may be used in different configurations.

To manufacture air cleaner assembly 102, the air cleaner assembly can, when fabricated from polymeric materials, be molded. For example, air cleaner assembly 102 can be fabricated using an injection molding technique, a blow molding technique, a compression molding technique, a rotational molding technique, or other suitable formation processing. In some examples, housing 120 and noise suppression chamber 124 (or at least a shared sidewall of the housing and noise suppression chamber 124) are integrally and permanently molded together during the manufacturing process. In other examples, housing 120 is formed separately from noise suppression chamber 124 (e.g., the exterior sidewall 138 and edge walls 142), and the walls of the noise suppression chamber are subsequently joined to housing 120. In either case, housing 120 and noise suppression chamber 124 may form a unitary structure that cannot be separated without permanently altering or modifying the air cleaner assembly.

In one configuration, all portions of housing 120 except end wall 129 are integrally (e.g., simultaneously) molded with noise suppression chamber 124 to form a unitary structure. End wall 129 in such an arrangement may constitute a cover that is formed separately from a remainder of the housing structure and is then joined to the remainder of the housing. The cover may be removable and/or openable in such a configuration to provide access to cavity 126.

In some examples, the thickness of the sidewall 122 separating the cavity 126 defined by housing 120 from the interior cavity of noise suppression chamber 124 may range from 1 mm to 6 mm. The exterior sidewall 138 and edge walls 142 of noise suppression chamber may have the same thickness as sidewall 122 or may have different thicknesses.

As noted above, first outlet opening 132 may be designed to allow a larger volume of filtered air to pass through the opening than second outlet opening 134. Accordingly, second outlet opening 134 may have a cross-sectional area (e.g., defined by diameter) less than a cross-sectional size of the first outlet opening 132. In some examples, second outlet opening 134 has a diameter less than 50% of the diameter of first outlet opening 132, such as less than 35%, or less than 20%.

Second outlet opening 134 can be located at any desired location along housing 120 downstream of air filtration element 128. In the illustrated configuration, second outlet opening 134 is formed in a region of smaller cross-sectional area defining first outlet opening 132 (which is a narrowing from a region of larger cross-sectional area defining the interior cavity 126 containing air filtration element 128). In this configuration, noise suppression chamber 124 includes a conduit 144 (FIG. 4) extending from the region of smaller cross-sectional area defining first outlet opening 132 across the thickness of housing 120 to an interior of the chamber. In other configurations, second outlet opening 134 may not be formed in a region of sidewall 122 having reduced cross-sectional area but may instead be formed in a region forming cavity 126. In addition, airflow outlet 136 is shown projecting outwardly from exterior sidewall 138, e.g., to allow tubing to connect to the outlet, although airflow outlet 136 may be designed without an exterior projecting component.

In the illustrated example, noise suppression chamber 124 defines a generally rectangular shape and second outlet opening 134 and airflow outlet 136 are positioned adjacent opposite corners of the generally rectangular shape (FIG. 2). Positioning second outlet opening 134 and airflow outlet 136 at substantially opposite ends of the major axis of noise suppression chamber 124 can help maximize the distance air flows from the inlet to the outlet of the housing, impacting noise suppression efficacy. In some examples, a distance 146 between a geometric center of second outlet opening 134 and a geometric center of airflow outlet 136 ranges from 25 mm to 300 mm. Distance 146 may be the distance air travels from second outlet opening 134 to airflow outlet 136 if traveling straight/linearly between the two openings.

Second outlet opening 134 and airflow outlet 136 may be the same size or may have different sizes. In some examples, airflow outlet 136 is as large or larger than second outlet opening 134, which may help prevent compression and acoustical energy as air passes from second outlet opening 134 to airflow outlet 136. In one configuration, second outlet opening 134 and airflow outlet 136 are substantially equivalent in size (e.g., plus or minus 10 percent). Second outlet opening 134 and/or airflow outlet 136 may have a size ranging from 175 square millimeters to 4500 square millimeters, although other size openings may be used.

In some examples, noise suppression chamber 124 is sized effective to limit an increase in noise when air is discharging from airflow outlet 136 as compared to when air is not discharging from airflow outlet 136 to less than 10 dBA, such as less than 5 dBA, or less than 2 dBA. Noise suppression chamber 124 may be a hollow cavity devoid of material through which filtered air travels from second outlet opening 134 to airflow outlet 136. Alternatively, noise suppression chamber 124 may include internal baffles, porous media, or other structure that creates a tortuous pathway for air to travel from second outlet opening 134 to airflow outlet 136.

Figure 5:
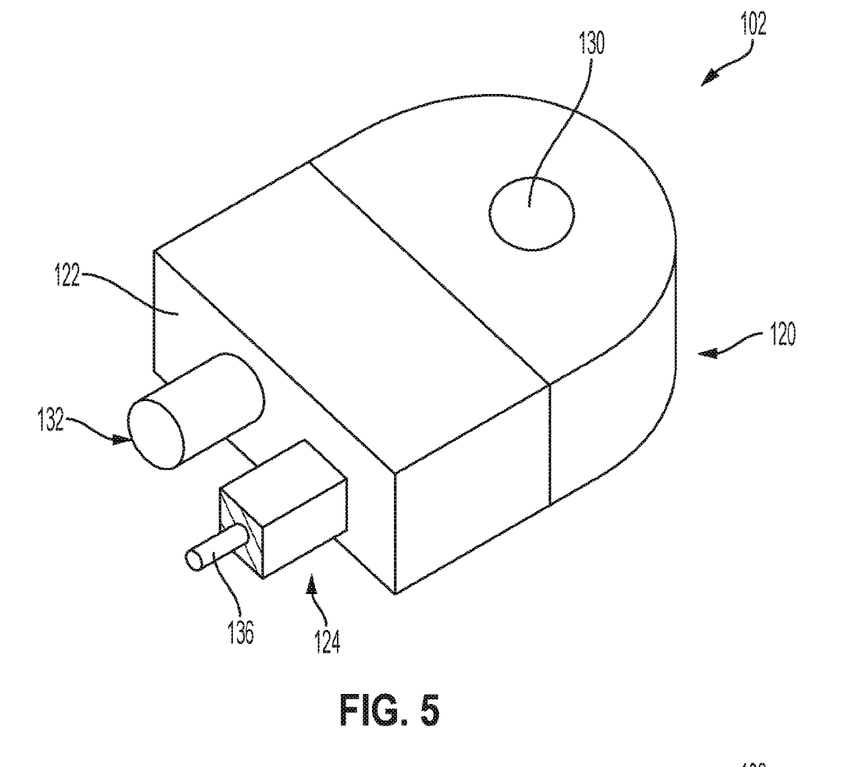
FIGS. 5 and 6 are perspective and top sectional views, respectively, showing another example configuration of an air cleaner assembly.
Figure 6:
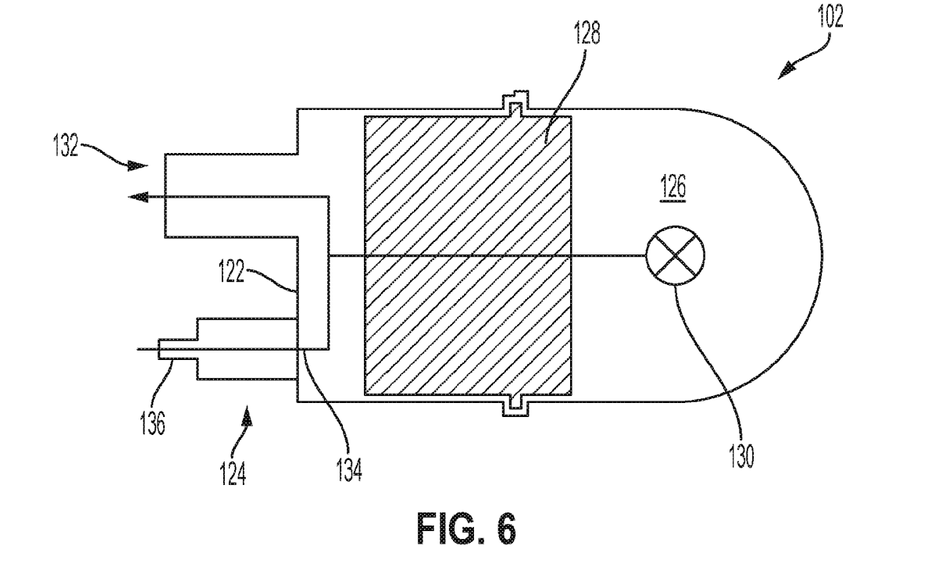

In practice, noise suppression chamber 124, including second outlet opening 134 and airflow outlet 136, can be positioned at a number of different locations relative to housing 120. FIGS. 5 and 6 are perspective and top sectional views, respectively, showing another example configuration of an air cleaner assembly 102 where like reference numerals refer to like elements discussed above with respect to FIGS. 2-4. As shown in this example, noise suppression chamber 124 projects axially away from housing 120 with a shared sidewall 122 separating an interior cavity 126 of housing 120 from an interior cavity of the noise suppression chamber. The length of noise suppression chamber 124 extending away from housing 120 in such a configuration may be greater than a height and/or width of the chamber sharing sidewall 122.

In addition, as illustrated, first outlet opening 132 and second outlet opening 134 are arranged axially in-line with an airflow direction through housing 120. Accordingly, air flowing through housing 120 can enter inlet opening 130 radially and flow axially along the length of the housing through air filtration element 128 before branching and discharging in parallel axially through first outlet opening 132 and second outlet opening 134. Other configurations and arrangements of noise suppression chamber 124 relative to housing 120 are possible, and the disclosure is not limited in this respect.

An air cleaner assembly 102 may receive one or more air filtration elements 128 to filter air or other gas passing through housing 120. Any type and configuration of air filtration media can be used, and the disclosure is not limited in this respect. In some examples, an air filtration element used in housing 120 is formed of a fluted filter media (media having media ridges) can be used in air cleaner assembly 102. One such type of fluted filter media is a z-filter media, which utilizes two specific media components joined together, to form the media construction. The two components are: (1) a fluted (typically corrugated) media sheet or sheet section, and, (2) a facing media sheet or sheet section. The facing media sheet is typically non-corrugated, however it can be corrugated, for example perpendicularly to the flute direction. Thus, a z-filter construction is one type of filter that can be used in which individual ones of corrugated, folded or otherwise formed filter flutes are used to define (typically in combination with facing media) sets of longitudinal, typically parallel, inlet and outlet filter flutes for fluid flow through the media. The air filtration element can include a seal formed as a continuous or discontinuous band around the exterior face and/or perimeter of the media, providing a deformable element that seals around the perimeter of the media.

Various examples have been described. These and other examples are within the scope of the following claims.

The invention claimed is:

1. An air cleaner assembly comprising:
   a housing having at least one sidewall, the housing defining:
      an interior cavity configured to receive an air filter element;
      an inlet opening configured to receive air to be filtered;
      a first outlet opening configured to discharge filtered air, and
      a second outlet opening configured to discharge filtered air;
   a noise suppression chamber formed by the at least one sidewall of the housing and an exterior sidewall spaced from the at least one sidewall of the housing,
      wherein the second outlet opening extends through the at least one sidewall of the housing in a region of the noise suppression chamber such that air is delivered through the second outlet opening into the noise suppression chamber,
      the noise suppression chamber has an airflow outlet configured to discharge air from the noise suppression chamber, and
      the at least one sidewall of the housing and the noise suppression chamber are integrally molded together from plastic.

2. The air cleaner assembly of claim 1, wherein the second outlet opening has a cross-sectional size less than a cross-sectional size of the first outlet opening.

3. The air cleaner assembly of claim 1, wherein the at least one sidewall comprises a first sidewall and a second sidewall, the second sidewall forming an end wall of the housing, and the noise suppression chamber is formed by the end wall and the exterior sidewall spaced from the end wall.

4. The air cleaner assembly of claim 1, wherein the exterior sidewall extends generally parallel to the at least one sidewall.

5. The air cleaner assembly of claim 1, wherein the noise suppression chamber further comprises a plurality of edge walls connecting the at least one sidewall of the housing to the exterior sidewall to form an enclosed chamber.

6. The air cleaner assembly of claim 1, wherein the at least one sidewall has a generally cylindrical shape.

7. The air cleaner assembly of claim 6, wherein the exterior sidewall is planar such that a distance between the planar exterior sidewall and the at least one sidewall varies across a curvature of the at least one sidewall.

8. The air cleaner assembly of claim 1, wherein the housing has a length, the noise suppression chamber has a length, and the length of the noise suppression chamber is parallel to the length of the housing.

9. The air cleaner assembly of claim 8, wherein length of the noise suppression chamber ranges from 25% to 90% of the length of the housing.

10. The air cleaner assembly of claim 8, wherein the second outlet opening and the airflow outlet are positioned at substantially opposite ends along the length of the noise suppression chamber.

11. The air cleaner assembly of claim 1, wherein a thickness of the at least one sidewall separating the interior cavity from an interior of the noise suppression chamber ranges from 1 mm to 6 mm.

12. The air cleaner assembly of claim 1, wherein the second outlet opening has a size ranging from 175 square millimeters to 4500 square millimeters and the airflow outlet has a substantially equivalent size to the size of the second outlet opening.

13. The air cleaner assembly of claim 1, wherein
   the at least one sidewall comprises a first sidewall and a second sidewall, the second sidewall forming an end wall of the housing,
   the inlet opening extends through the first sidewall, and
   the first outlet opening is formed at an opposite end of the housing from the end wall.

14. The air cleaner assembly of claim 1, wherein the inlet opening is radially offset from the second outlet opening about the at least one sidewall at least 90 degrees.

15. The air cleaner assembly of claim 1, wherein the at least one sidewall transitions from a region of larger cross-sectional area defining the interior cavity to a region of smaller cross-sectional area defining the first outlet opening, and the second outlet opening is formed in the region of smaller cross-sectional area.

16. The air cleaner assembly of claim 15, wherein the noise suppression chamber has a body region extending along the region of larger cross-sectional area and a supply conduit region extending along the region of smaller cross-sectional area.

17. The air cleaner assembly of claim 1, wherein the airflow outlet projects outwardly from the exterior sidewall.

18. The air cleaner assembly of claim 1, wherein:
   the first outlet opening is configured to discharge filtered air for supply to a combustion engine, and
   the second outlet opening is configured to discharge filtered air for supply to a compressor.

19. The air cleaner assembly of claim 1, wherein the noise suppression chamber defines a void space through which air travels.

* * * * *